United States Patent
Neumayer

(10) Patent No.: US 10,246,549 B2
(45) Date of Patent: Apr. 2, 2019

(54) FAST CURE EPOXY RESINS AND PREPREGS OBTAINED THEREFROM

(71) Applicant: Hexcel Holding GMBH, Pasching (AT)

(72) Inventor: Bernhard Neumayer, Pasching (AT)

(73) Assignee: HEXCEL HOLDING GMBH, Pasching (AT)

( * ) Notice: Subject to any disclaimer, the term of this patent is extended or adjusted under 35 U.S.C. 154(b) by 0 days.

(21) Appl. No.: 15/533,310

(22) PCT Filed: Dec. 16, 2015

(86) PCT No.: PCT/EP2015/080091
§ 371 (c)(1),
(2) Date: Jun. 5, 2017

(87) PCT Pub. No.: WO2016/102282
PCT Pub. Date: Jun. 30, 2016

(65) Prior Publication Data
US 2017/0342196 A1    Nov. 30, 2017

(30) Foreign Application Priority Data

Dec. 24, 2014 (EP) .................................. 14200317

(51) Int. Cl.
| | |
|---|---|
| C08J 5/10 | (2006.01) |
| C08G 59/40 | (2006.01) |
| B32B 5/02 | (2006.01) |
| A63C 5/12 | (2006.01) |
| C08J 5/04 | (2006.01) |
| C08J 5/24 | (2006.01) |
| C08K 3/36 | (2006.01) |
| B29B 11/16 | (2006.01) |
| B29K 63/00 | (2006.01) |
| B32B 15/20 | (2006.01) |
| C08G 59/24 | (2006.01) |
| C08G 59/68 | (2006.01) |
| C08L 63/00 | (2006.01) |
| B32B 15/092 | (2006.01) |

(52) U.S. Cl.
CPC .......... *C08G 59/4021* (2013.01); *B29B 11/16* (2013.01); *B32B 5/022* (2013.01); *B32B 15/092* (2013.01); *B32B 15/20* (2013.01); *C08G 59/245* (2013.01); *C08G 59/686* (2013.01); *C08J 5/043* (2013.01); *C08J 5/10* (2013.01); *C08J 5/24* (2013.01); *C08K 3/36* (2013.01); *C08L 63/00* (2013.01); *A63C 5/12* (2013.01); *B29K 2063/00* (2013.01); *B32B 2260/021* (2013.01); *B32B 2260/046* (2013.01); *C08J 2363/00* (2013.01); *C08J 2363/02* (2013.01); *C08J 2463/10* (2013.01); *C08L 2205/06* (2013.01)

(58) Field of Classification Search
CPC ... B29B 11/16; B29K 2063/00; B32B 15/092; B32B 2260/021; B32B 2260/046; B32B 15/20; B32B 5/02; B32B 5/022; C08G 59/4021; C08G 59/686; C08G 59/14; C08J 2363/02; C08J 2463/10; C08J 5/043; C08J 5/24; C08J 2363/00; C08J 5/10; C08J 3/242; C08J 3/24; C08L 2205/06; C08L 63/00; C08K 3/36
USPC .......................................... 428/297.4; 442/59
See application file for complete search history.

(56) References Cited

U.S. PATENT DOCUMENTS

| | | |
|---|---|---|
| 2005/0163989 A1 | 7/2005 | O'Byrne |
| 2006/0035088 A1 | 2/2006 | Takano et al. |

FOREIGN PATENT DOCUMENTS

| | | |
|---|---|---|
| EP | 1279688 | 6/2005 |
| GB | 2505032 A | 2/2014 |
| WO | 2014/001537 A1 | 1/2014 |

*Primary Examiner* — Camie S Thompson
(74) *Attorney, Agent, or Firm* — W. Mark Bielawski; David J. Oldenkamp

(57) ABSTRACT

This invention relates to a composition comprising a semi-solid epoxy resin containing a curative dispersed therein. The curative has a particle size such that at least 90% of the particles have a size below 25 pm at ambient temperature of 21° C., wherein the composition further comprises a diluent containing a particulate filler. The composition is used as matrix in prepregs. The use of the diluent increases peel strength of the composition when brought into contact with metal or wood substrate.

7 Claims, No Drawings

FAST CURE EPOXY RESINS AND PREPREGS OBTAINED THEREFROM

The present invention relates to fast cure epoxy resins and their use. The invention is particularly concerned with the production of resin based fibre reinforced structures from fibre impregnated with a curable epoxy resin. Such layers of curable structures in which the resin is uncured are sometimes known as prepregs. In one embodiment the invention is concerned with the provision of prepregs useful in the production of sporting goods such as skis.

Prepreg is the term used to describe fibres impregnated with a resin in the uncured or partially cured state and ready for curing. The fibres may be in the form of tows or fabrics and a tow generally comprises a plurality of thin fibres. The selection of the fibrous materials and the chemical composition of the resins employed in the prepregs will depend upon the properties required of the cured fibre reinforced material and also the use to which the cured material is to be put. In one embodiment the invention provides a system based on a single epoxy resin and which can be rapidly cured.

The present invention therefore also relates to prepregs comprising fibres, fast cure epoxy resins which may be cured to form a reinforced composite material, and fibre reinforced materials so produced. The reinforced materials are lightweight and of high strength.

Epoxy resins are frequently used in such applications. The resins are curable and curing agents and curing agent accelerators are usually included in the resin to shorten the cure cycle time. Epoxy resin formulations contain a resin and one or more heat activated curing agents. Typically the formulations are cured by heating to a certain temperature for a certain time and formulations are developed to provide the desired cure temperature and cure time. The reactivity of the formulation is measured as the time required to accomplish a certain degree of cure when held at a certain temperature.

In the production of finished articles the prepregs may be cured and laminated together such as in a stack or they may be laminated to other materials. Typically curing takes place by heating the prepregs in a mould, a press or in a vacuum bag. The cure cycles employed for curing prepregs and stacks of prepregs are a balance of temperature and time, taking into account the reactivity of the resin and the amount of resin and fibre employed. From an economic point of view, in many applications it is desirable that the cycle time be as short as possible and curing agents and accelerators are usually included in the epoxy resin to speed up the cure cycle.

As well as requiring heat to initiate curing of the resin, the curing reaction itself can be highly exothermic and this needs to be taken into account in the time/temperature curing cycle. This is particularly important for the curing of large and thick stacks of prepregs as is increasingly the case with the production of laminates for industrial application where large amounts of epoxy resin are employed and high temperatures can be generated within the stack due to the exotherm of the resin curing reaction. Excessive temperatures are to be avoided as they can damage the mould reinforcement or cause some decomposition of the resin. Excessive temperatures can also cause loss of control over the cure of the resin leading to run away cure.

In addition to these problems there is a desire to produce laminar structures from prepregs in which the cured resin has high glass transition temperatures (Tg) such as above 80° C. to extend the usefulness of the structures by improving their resistance to exposure at high temperatures and/or high humidity for extended periods of time which can cause an undesirable lowering of the Tg. Increase in the Tg may be achieved by using a more reactive resin. However the higher the reactivity of the resin the greater the heat released during curing of the resin in the presence of hardeners and accelerators which increases the attendant problems as previously described.

There has been a need to speed up the cure of resin systems. Techniques that have been used include the use of solutions of epoxy resins, pre-reacted (sometimes known as B-staged) resins or catalysed hot-melt epoxy resin systems. Each of these techniques suffers from drawbacks. The use of a solution requires the use of solvents which must be removed and disposed of. The solvents are typically low boiling and flammable and their disposal, sometimes by burning can be damaging to the environment.

Pre-reaction of the resin prior to formation of the prepreg can reduce the shelf-life of the prepreg at ambient conditions and the handleability of the prepreg can be impaired as the pre-reaction of the resin can lead to the prepreg becoming brittle. Hot melt systems are expensive and require a multistage process including melting, blending and catalysation.

These fast curing resins also show poor peel strength in contact with substrates such as wood or metal. This prevents the application of these resins in the large volume production of sporting goods such as skis, snowboards, surf boards, skate boards, and hockey sticks. European Patent 1279688 relates to quick cure carbon fibre reinforced epoxy resins. The resin system is a blend of two epoxy resins of different molecular weight together with a latent curative such as a urea based catalyst. The resin system may be impregnated into a fibre reinforcement to provide a rapid cure prepreg. The system of EP 1279688 comprising a specific blend of polyepoxides, dicyandiamide (DICY) and a 2,4 toluene bis dimethyl urea catalyst obtains a 95% cure at 130° C. in 19 minutes and a 95% cure at 150° C. in as little as 3 minutes.

The system of EP 1279688 is complex requiring the selection and blending of two epoxy resins. Additionally there still remains the need for faster cure resins with an acceptable shelf-life at ambient temperature and which are simple to formulate.

The inventions aims to obviate or at least mitigate the above defined problems and/or to provide improvements generally.

According to the invention there is provided a composition, a process, a use and a structure as defined in any one of the accompanying claims.

The present invention addresses these issues and provides a low-cost fast curing epoxy resin with an improved peel strength. Additionally the invention provides prepregs based on the fast curing epoxy resins which have an increased peel strength when applied to substrates such as metal or wood in comparison to prepregs in which no diluent is present.

The invention provides a semisolid epoxy resin containing a curative of particle size such that at least 90% of the particles have a size below 25 μm.

The invention further provides a prepreg comprising a fibrous material and a semisolid epoxy resin containing a curative of particle size such that at least 90% of the particles have a size below 25 μm as determined using sieve analysis in accordance with ASTM D1214. The particle size may also be measured by light scattering using a Malvern Mastersizer 2000.

The particle size of the particles is at least greater than 0.01 μm, preferably greater than 0.05 μm and more preferably greater than 0.1 μm as determined by ASTM D1214.

In an embodiment, the average particle size (D50) is in the range of from 10 to 25 µm, preferably from 14 to 23 µm and more preferably from 15 to 20 µm and/or combinations of the aforesaid ranges. Average particle size (D50) is measured using a Malvern Mastersizer 2000.

In a further embodiment the invention provides a process for the manufacture of a fast cure epoxy resin comprising continuously mixing a semisolid epoxy resin and a curative of particle size such that at least 90% of the particles have a size below 25 µm in combination with a particulate filler diluent.

In a yet further embodiment the invention provides a process for the continuous manufacture of a prepreg comprising mixing a semisolid epoxy resin and a curative of particle size such that at least 90% of the particles have a size below 25 µm and continuously dispensing the mixture onto a moving fibrous reinforcement material in combination with a diluent to produce a prepreg.

Within this application a semisolid epoxy resin is an epoxy resin that has an uncured glass transition temperature (Tg) in the range of −5° C. to 20° C., preferably from −1° C. to 18° C., and more preferably from 5° C. to 15° C. and/or combinations of the aforesaid ranges, as measured by Differential Scanning calorimetry by heating the sample from −40° C. to 270° C. at 10° C. per minute in accordance with ASTM E1356.

We have found that the combination of the semisolid epoxy resin, the particulate filler diluent and the curative of particle size such that 90% of the particles have a size below 25 µm at temperatures below 0° C., or at 10° C., 15° C., 20° C., 25° C., 30° C., 40° C., or at 50° C. and/or combinations of the aforesaid temperatures, provides a composition that can be readily applied to a continuously moving fibrous web and furthermore can be cured quickly to provide 95% cure at 120° C. in no more than 10 minutes and a 95% cure at 130° C. in no more than 6 minutes. Additionally, the combination may be based on a single epoxy resin and can be prepared by simple mixing of the two components without the need for solvents or the blending of multiple epoxy resins. The resin composition can be readily applied to a moving fibrous web to produce a prepreg which can be rapidly cured which is desirable for the production of many articles particularly sporting goods such as skis.

We have found that dilution of the composition increases the peel strength of the composition on a metal or wood substrate in comparison with a composition in which no diluent is present.

The diluent comprises a particulate filler. The particulate filler is selected from micro balloons, glass, carbon, metal and/or combinations of the aforesaid fillers. The filler may be present in the range of from 5% to 30% by weight based on the weight of the composition, preferably from 8 to 28% by weight based on the weight of the composition, more preferably from 10% to 25% by weight based on the weight of the composition and even more preferably from 15% to 25% by weight based on the weight of the composition and/or combinations of the aforesaid ranges.

The composition of the invention may further comprise a fibrous reinforcement material, preferably in the form of a non-woven reinforcement material such as a fleece. This composition may be in the form of a prepreg.

In another aspect there is provided a use of a diluent in a composition comprising a semisolid epoxy resin containing a curative dispersed therein, said curative having a particle size such that at least 90% of the particles have a size below 25 µm at ambient temperature of 21° C. to increase the peel strength (as measured in accordance with ASTM D1876) of the composition when brought into contact with a metal or wood substrate. The peel strength is improved in comparison with a composition in which no diluent is present.

The diluent may comprise a particulate filler selected from micro balloons, silica, kaolin, talc, glass, carbon, metal and/or combinations of the aforesaid fillers.

In a further aspect there is provided a composite structure comprising a cured prepreg comprising a fibrous material and a semisolid epoxy resin containing a curative of particle size such that at least 90% of the particles have a size below 25 µm at ambient temperature and a particulate filler based diluent, bonded to a substrate.

The peel strength may be in the range of from 3 N/mm² to 13 N/mm², preferably from 5.5 N/mm² to 11 N/mm², and more preferably from 5.75 N/mm to 6.1 N/mm² and/or combinations of the aforesaid ranges (measured in accordance with ASTM 1876).

The curative system of the present invention is preferably a mixture of a latent curative and an accelerator. The mixture is blended so that at least 90% of the particles have an average particle size below 25 µm preferably below 10 µm and preferably at least 98% of the particles are of a size less than 10 µm. The particle size is measured using sieves in accordance with ASTM D1214 or by a laser diffraction system such as the Malvern Mastersizer 2000 using their standard measurement protocol. Mixing takes place at temperatures in the range of from −10° C. to 80° C., or from 0° C. to 90° C., or from 20 to 80° C., or from 30 to 80° C., or from 35 to 60° C., or from 15 to 25° C. and/or combinations of the aforesaid temperature ranges and values.

The residence time during which mixing may take place at the aforesaid mixing temperatures may range from 10 s to 30 mins, from 10 s to 20 mins, from 30 s to 15 mins, from 1 min to 20 mins, from 2 mins to 10 mins, or from 5 mins to 10 mins and/or combinations of the aforesaid ranges and values.

Following mixing the mixture may be cooled to temperature of less than 35° C., or less than 30° C., 25° C., 20° C., 15° C., 10° C. or 5° C. and/or combinations of the aforesaid values.

Typically the curative may dissolve in the semisolid epoxy resin at temperatures ranging from 20 to 80° C., or 40 to 80° C., or 50 to 70° C., or 60 to 65° C. and/or combinations of the aforesaid temperature ranges and values.

The curative system preferably comprises from 5 to 20% by weight of the combined weight of the resin and the curative system and the curative preferably comprises from 2 wt % to 15% by weight of the mixture and the accelerator preferably comprises from 1% to 10% by weight of the resin and the curative system. The use of a dicyandiamide curative and/or a urea based accelerator is preferred. Preferred urea based materials are the range of materials available under the commercial name DYHARD® the trademark of Alzchem, and urea derivatives such as the ones commercially available as UR200, UR300, UR400, UR600 and UR700. It is preferred to use from 5% to 20% of the curative system based on the weight of the semisolid epoxy resin and the curative system, more preferably 8 to 15 wt %.

Additionally we prefer that the curative system contains an anticaking agent such as the silica base anticaking agents available from Evonik as Sipernat® to ensure that the particles do not aggregate.

We have found that the mixtures of the present invention have the added benefit that they are non-tacky to the touch at ambient temperature and so can be easily handled for storage and transportation. The semisolid resins themselves have low tack and the use of the finely divided curative system of particles of at least 90% of average particle size below 25 µm preferably at least 98% below 10 µm further reduces the tack at temperatures from −10° C. to 80° C., or from 0° C., to 60° C., or from 0 to 40° C., or from 5 to 30° C., or from 10 to 28° C., or from 15 to 25° C., or at ambient temperature (21° C.) and/or combinations of the aforesaid temperature ranges and values. In addition they can be applied continuously to moving fibrous webs and can be used to produce prepregs that can be rapidly cured.

The prepregs of this invention are typically used at a different location from where they are manufactured and they therefore require handleability. It is therefore preferred that they are dry or as dry as possible and have low surface tack. The use of the high viscosity semisolid resins has this benefit and also has the benefit that the impregnation of the fibrous layer is slow allowing air to escape and to minimise void formation.

In order to produce final laminates with substantially uniform mechanical properties it is important that the structural fibres and the epoxy resin be mixed to provide a substantially homogeneous prepreg. This requires uniform distribution of the structural fibres within the prepreg to provide a substantially continuous matrix of the resin surrounding the fibres. It is therefore important to minimise the inclusion of air bubbles within the resin during application to the fibres. The prepregs should contain a low level of voids.

The prepregs of this invention are intended to be laid-up with other materials which may be composite materials (e.g. other prepregs according to the invention, other prepregs or other materials such as metals particularly aluminium and wood) to produce a prepreg stack which can be cured to produce a fibre reinforced laminate.

In a preferred embodiment there is provided a sporting good, preferably a ski, the good comprising a core material having applied on at least one surface thereof a fibrous reinforcement preimpregnated with the composition of the invention to form a prepreg, the assembly of core material and prepreg being cured. The core material may comprise wood, metal or polyurethane. The assembly may be cured by compression moulding at a temperature of from 60 to 200° C., preferably from 80 to 180° C. and more preferably from 100 to 140° C. or from 110 to 130° C. and/or combinations of the aforesaid ranges, for a duration of from 15 mins to 30 s, 12 to 4 minutes, 10 to 1 minutes, 8 to 3 minutes and/or combinations of the aforesaid durations.

In another embodiment of the invention the composition may be curable at a temperature of from 60 to 200° C., preferably from 80 to 180° C. and more preferably from 100 to 140° C. or from 110 to 130° C. and/or combinations of the aforesaid ranges, for a duration of from 15 to 30 s, 10 to 1 minutes, 7 to 2 minutes, 5 to 3 minutes and/or combinations of the aforesaid durations. Preferably, the composition is cured at a temperature of from 110 to 130° C. for a duration of 1 to 3 minutes, preferably 2 minutes.

We have found that the diluent retains the composition of the invention in contact with the fibrous reinforcement so that there is less than 2% change in fiber volume content in an uncured preimpregnated fibrous reinforcement material (prepreg) in relation to the cured prepreg during curing at temperatures of from 110 to 130° C. for a duration of 1 to 3 minutes (fiber volume content determined by ASTM C613 (prepreg) and ASTM D2584 (cured prepreg)).

The semisolid epoxy resin used in this invention has a high reactivity as indicated by an EEW in the range from 150 to 1500 preferably a high reactivity such as an EEW in the range of from 200 to 500 and the resin composition comprises the resin and an accelerator or curing agent. Suitable epoxy resins may be selected from monofunctional, difunctional, trifunctional and/or tetrafunctional epoxy resins. Blends of resins may be used although the use of a single resin is preferred to avoid an additional blending step.

Suitable difunctional epoxy resins, by way of example, include those based on: diglycidyl ether of bisphenol F, diglycidyl ether of bisphenol A (optionally brominated), phenol and cresol epoxy novolacs, glycidyl ethers of phenol-aldehyde adducts, glycidyl ethers of aliphatic diols, diglycidyl ether, diethylene glycol diglycidyl ether, aromatic epoxy resins, aliphatic polyglycidyl ethers, epoxidised olefins, brominated resins, aromatic glycidyl amines, heterocyclic glycidyl imidines and amides, glycidyl ethers, fluorinated epoxy resins, glycidyl esters or any combination thereof.

Difunctional epoxy resins may be selected from diglycidyl ether of bisphenol, diglycidyl ether of bisphenol A, diglycidyl dihydroxy naphthalene, or any combination thereof.

Suitable trifunctional epoxy resins, by way of example, may include those based upon phenol and cresol epoxy novolacs, glycidyl ethers of phenol-aldehyde adducts, aromatic epoxy resins, aliphatic triglycidyl ethers, dialiphatic triglycidyl ethers, aliphatic polyglycidyl amines, heterocyclic glycidyl imidines and amides, glycidyl ethers, fluorinated epoxy resins, or any combination thereof. Suitable trifunctional epoxy resins are available from Huntsman Advanced Materials (Monthey, Switzerland) under the tradenames MY0500 and MY0510 (triglycidyl para-aminophenol) and MY0600 and MY0610 (triglycidyl meta-aminophenol). Triglycidyl meta-aminophenol is also available from Sumitomo Chemical Co. (Osaka, Japan) under the tradename ELM-120.

Suitable tetrafunctional epoxy resins include N,N, N',N'-tetraglycidyl-m-xylenediamine (available commercially from Mitsubishi Gas Chemical Company under the name Tetrad-X, and as Erisys GA-240 from CVC Chemicals), and N,N,N',N'-tetraglycidylmethylenedianiline (e.g. MY0720 and MY0721 from Huntsman Advanced Materials). Other suitable multifunctional epoxy resins include DEN438 (from Dow Chemicals, Midland, Mich.) DEN439 (from Dow Chemicals), Araldite ECN 1273 (from Huntsman Advanced Materials), and Araldite ECN 1299 (from Huntsman Advanced Materials).

The structural fibres employed in the prepregs of this invention may be of any suitable material, glass fibre, carbon fibre, natural fibres (such as basalt, hemp, seagrass, hay, flax, straw, coconut) and aramie being particularly preferred. They may be tows or fabrics and may be in the form of random, knitted, non-woven, multi-axial or any other suitable pattern. For structural applications, it is generally preferred that the fibres be unidirectional in orientation. When unidirectional fibre layers are used, the orientation of the fibre can vary throughout the prepreg stack. However, this is only one of many possible orientations for stacks of unidirectional fibre layers. For example, unidirectional fibres in neighbouring layers may be arranged orthogonal to each other in a so-called 0/90 arrangement, which signifies the angles between neighbouring fibre layers. Other arrangements, such as 0/+45/−45/90 are of course possible, among many other arrangements.

The structural fibres may comprise cracked (i.e. stretch-broken), selectively discontinuous or continuous fibres. The structural fibres may be made from a wide variety of materials, such as carbon, graphite, glass, metalized polymers, aramid and mixtures thereof. The structural fibres may be individual tows made up of a multiplicity of individual fibres and they may be woven or non-woven fabrics. The fibres may be unidirectional, bidirectional or multidirectional according to the properties required in the final laminate. Typically the fibres will have a circular or almost circular cross-section with a diameter in the range of from 3 to 30 µm, preferably from 5 to 19 µm. Different fibres may be used in different prepregs used to produce a cured laminate.

Exemplary layers of unidirectional structural fibres are made from HexTow® carbon fibres, which are available from Hexcel Corporation. Suitable HexTow® carbon fibres for use in making unidirectional fibre layers include: IM7 carbon fibres, which are available as fibres that contain 6,000 or 12,000 filaments and weight 0.223 g/m and 0.446 g/m respectively; IM8-IM10 carbon fibres, which are available as fibres that contain 12,000 filaments and weigh from 0.446 g/m to 0.324 g/m; and AS7 carbon fibres, which are available in fibres that contain 12,000 filaments and weigh 0.800 g/m.

The structural fibres of the prepregs will be substantially impregnated with the epoxy resin and prepregs with a resin content of from 20 to 85 wt % of the total prepreg weight are preferred more preferably with 30 to 50 wt % resin.

Epoxy resins can become brittle upon curing and toughening materials can be included with the resin to impart durability, although they may result in an undesirable increase in the viscosity of the resin. The toughening material may be supplied as a separate layer such as a veil.

Where the additional toughening material is a polymer it should be insoluble in the matrix epoxy resin at room temperature and at the elevated temperatures at which the resin is cured. Depending upon the melting point of the thermoplastic polymer, it may melt or soften to varying degrees during curing of the resin at elevated temperatures and re-solidify as the cured laminate is cooled. Suitable thermoplastics should not dissolve in the resin, and include thermoplastics, such as polyamides (PA), polyethersulfone (PES) and polyetherimide (PEI). Polyamides such as nylon 6 (PA6) and nylon 12 (PA12) and mixtures thereof are preferred.

The composition of the invention comprises a modifier. The modifier may toughen the resin composition and may therefore be considered a toughener. The toughnener is preferably premixed with an epoxy resin. The toughnener may also be adducted to the epoxy resin.

The toughener may be in the form of a core shell elastomer. The core shell elastomer used in the formulation of this invention is preferably a blend of a core shell elastomer particle in an epoxy resin. These materials generally include about 1:5 to 5:1 parts of epoxy to elastomer, and more preferably about 1:3 to 3:1 parts of epoxy to elastomer. More typically, the core shell elastomer includes at least about 5%, more typically at least about 12% and even more typically at least about 18% elastomer and also typically includes not greater than about 50%, even more typically no greater than about 40% and still more typically no greater than about 35% elastomer, although higher or lower percentages are possible.

The elastomer may be functionalized at either the main chain or the side chain. Suitable functional groups include, but are not limited to, —COOH, —NH$_2$, —NH—, —OH, —SH, —CONH$_2$, —CONH—, —NHCONH—, —NCO, —NCS, and oxirane or glycidyl group etc. The elastomer optionally may be vulcanizeable or post-crosslinkable. Exemplary elastomers include, without limitation, natural rubber, styene-butadiene rubber, polyisoprene, polyisobutylene, polybutadiene, isoprenebutadiene copolymer, neoprene, nitrile rubber, butadiene-acrylomitrile copolymer, butyl rubber, polysulfide elastomer, acrylic elastomer, acrylonitrile elastomers, silicone rubber, polysiloxanes, polyester rubber, disocyanatelinked condensation elastomer, EPDM (ethylene-propylene diene rubbers), chlorosulfonated polyethylene, fluorinated hydrocarbons, thermoplastic elastomers such as (AB) and (ABA) type of block copolymers of styrene and butadiene or isoprene, and (AB)n type of multi-segment block copolymers of polyurethane or polyester, and the like. In the case that carboxyl-terminated butadiene-acrylonitrile (CTBN) is used as the functionalized elastomer, the preferable nitrile content is from 5-35% by weight based on the resin composition, more preferably from 20-33% by weight based on the resin composition.

Preferably, the core shell elastomer is a core shell rubber.

Core shell elastomers are frequently sold in admixture with an epoxy resin and these products are useful in the present invention. A suitable material is the MX range of products available from Kaneka such as MX153 and MX416.

In another embodiment the core shell elastomer/epoxy resin composition may be in the form of an elastomer/epoxy adduct. An example of a preferred epoxide-functionalized epoxy/core shell elastomer which is sold in admixture with an epoxy resin is the product with the trade name HyPox™ RK84, a bisphenol A epoxy resin blended with CTBN elastomer, and also the product with the trade name HyPox™ RA1340, an epoxy phenol novolac resin modified with CTBN elastomer, both commercially available from CVC Thermoset Specialities, Moorestown, N.J. In addition to bisphenol A epoxy resins, other epoxy resins can be used to prepare the epoxy/elastomer adduct, such as n-butyl glycidyl ether, styrene oxide and phenylglycidyl ether; bifunctional epoxy compounds such as bisphenol A diglycidyl ether, bisphenol F diglycidyl ether, bisphenol S diglycidyl ether and diglycideyl phthalate; trifunctional compounds such as triglycidul isocyanurate, triglycidyl p-aminophenol; tetrafunctional compounds such as tetraglycidyl m-xylene diamine and tetraglycidyldiaminodiphenylmethane; and compounds having more functional groups such as cresol novolac polyglycidyl ether, phenol novolac polyglycidyl ether and so on.

In a preferred embodiment the aforesaid tougheners or modifiers used alone or in combination in the composition of the invention, increase the peel strength of the composition when cured in comparison to a composition in which the toughener or modifier is not present.

In a preferred embodiment, the toughener or modifier comprises a nitrile rubber. The modifier may comprise from 10 to 50% by weight, preferably from 15 to 45% by weight and more preferably from 35 to 40% by weight and/or combinations of the aforesaid ranges of a nitrile rubber. In a further embodiment the toughener or modifier comprises a nitrile rubber modified bis F epoxy block copolymer.

The prepregs of this invention are produced by impregnating the fibrous material with the epoxy resin. In order to increase the rate of impregnation, the process is preferably carried out at an elevated temperature so that the viscosity of the resin is reduced. However it must not be so hot for sufficient length of time that premature curing of the resin occurs. Thus, the impregnation process is preferably carried out at temperatures in the range of from 40° C. to 80° C. Typically the resin will be applied to the fibrous material at a temperature in this range and consolidated into the fibrous material by pressure such as that exerted by passage through one or more pairs of nip rollers.

The resin composition of the present invention may be prepared by feeding the semisolid epoxy resin and the curative system to a continuous mixer where a homogenous mixture of the semisolid epoxy resin and the curative system is formed. The mixing is typically performed at a temperature in the range 35 to 80° C. The mixture may then be cooled and pelletized or flaked for storage. Alternatively the mixture may be fed directly from the continuous mixer onto a prepreg line where it is deposited onto a moving fibrous layer and consolidated into the fibrous layer usually by passage through nip rollers. The prepreg may then be rolled and stored or transported to the location at which it is to be used. An additional benefit of the prepregs based on the resin composition of the present invention is that as the resin is not tacky to the touch at ambient temperature a backing sheet for the prepreg may not be required.

In an embodiment, there is provided a process for the manufacture of a cured composite material, the process comprising the steps of blending together a semisolid curable resin and a solid curing agent in powder form to form a blend of curable resin and curing agent, at least partially impregnating a structural fibre arrangement with the blended curable resin and curing agent to form a curable composite material, followed by curing the composite material by exposure to elevated temperature and at a pressure of no greater than 3.0 bar absolute to form a cured composite material.

In a preferred embodiment, the curing agent has a melting point in the range of 40 to 80° C., preferably 50 to 70° C., more preferably 60 to 70° C., even more preferably 60 to 65° C.; or combinations of the aforesaid ranges. The melting point is determined by DSC (Differential Scanning calorimetry) in accordance with ASTM D3418.

The particle size of the curing agent may be as hereinbefore described. Alternatively, the particle size of the solid curing agent may be small, typically in the range of from 0.01 microns to 5 mm, more preferably from 0.1 microns to 1 mm, more preferably from 0.5 microns to 0.5 mm, even more preferably from 1 microns to 0.1 mm, and most preferably from 10 microns to 0.1 mm and/or combinations of the aforesaid ranges. The particle size is derived from the particle size distribution as determined by ASTM D1921-06e1 Standard Test Methods for Particle Size (Sieve Analysis) of Plastic Materials (Method A).

Small particles have the advantage of dissolving quicker thereby reducing the residence time in the blender and increasing the flow of resin through the blender. This in turn reduces the risk of an uncontrolled release of exotherm energy of the blend and reduced activity of the resin following blending. If the blender is an extruder, this results in a shorter extruder which reduces the cost of the processing equipment.

Following high temperature blending which results in the dissolution of the curing agent in the resin and subsequent cooling of the blend, the blend forms a reinforcement resin which is suitable in combination with a fibre arrangement to provide a moulding material.

Preferably, blending takes place below the dissolution temperature of the curative so that the curative remains present in the semisolid resin in particle form.

The blending temperature may range from a temperature at which the curing agent does not dissolve into the curable resin up to a temperature below the melting point of the curing agent. Thus, typically the blending temperature is from 10 to 90° C., preferably from 10 to 60° C., more preferably from 20 to 50° C.

Blending the curable resin and curing agent together at an elevated temperature increases the tendency for them to react prematurely together potentially leading to a thermal safety hazard or runaway exotherm reaction. Also, as the elevated blending temperature increases the activation level of the resin which enables the resin proceed to cure as the interpolymer network is formed, blending effectively reduces the activity of the resin. Thus, it is preferable if the blending operation at high temperature is carried out for as short a time as possible whilst ensuring good blending takes place.

In a preferred embodiment, blending is conducted in an in line or continuous process. Preferably, only a portion of the liquid resin is blended with the curing agent at any one time to control the temperature of the blend and to prevent the blend from curing prematurely. The residence time during blending is selected such that the solid curing agent is dissolved in the curable resin. The residence time in the blender may range from 1 s to 10 minutes, preferably from 30 s to 5 minutes, more preferably from 30 s to 2 minutes. The residence time is defined by the flow of the liquid resin through the blender and the dimensions of the blender, i.e. residence time=volume of blender/flow rate through blender.

Following blending, the blend may be cooled. Cooling may be conducted by increasing the surface area of the reinforcement resin to enable fast heat transfer. The resin may be exposed to a cooling medium such as air or a cooler or chiller. The blend may be cooled by casting of the blend or by impregnation of a structural fibre arrangement.

In a further embodiment, the liquid curable resin comprises a toughener or thoughening agent. Preferably, the toughener or toughening agent is a thermoplastic. The thermoplastic toughening agent may be any of the typical thermoplastic materials that are used to toughen thermosetting aerospace resins. The toughening agents may be polymers, which can be in the form of homopolymers, copolymers, block copolymers, graft copolymers, or terpolymers. The thermoplastic toughening agents may be thermoplastic resins having single or multiple bonds selected from carbon-carbon bonds, carbon-oxygen bonds, carbon-nitrogen bonds, silicon-oxygen bonds, and carbon-sulphur bonds. One or more repeat units may be present in the polymer which incorporate the following moieties into either the main polymer backbone or to side chains pendant to the main polymer backbone: amide moieties, imide moieties, ester moieties, ether moieties, carbonate moieties, urethane moieties, thioether moieties, sulphone moieties and carbonyl moieties. The polymers may be either linear or branched in structure. The particles of thermoplastic polymer may be either crystalline or amorphous or partially crystalline.

Suitable examples of thermoplastic materials that are used as a toughening agent include polyamides, polycarbonates, polyacetal, polyphenylene oxide, polyphenylene sulphide, polyarylates, polyethers, polyesters, polyimides, polyamidoimides, polyether imides, polysulphones, polyurethanes, polyether sulphones, polyether ethersulfones and polyether ketones. Polyether sulfones and polyether ethersulfone are the preferred type of thermoplastic material. The amount of toughening agent present in the uncured resin composition will typically range from 5 to 30 wt %. Preferably, the amount of toughening agent will range from 10 wt % to 20 wt %.

Examples of commercially available thermoplastic toughening agents include Sumikaexcel 5003P PES, which is available from Sumitomo Chemicals Co. (Osaka, Japan), Ultrason E2020P SR, which is available from BASF (Ludwigshafen, Germany) and Solvay Radel A, which is a copolymer of ethersulfone and etherethersulfone monomer units that is available from Solvay Engineered Polymers, Auburn Hills, USA. Optionally, these PES or PES-PEES copolymers may be used in a densified form. The densification process is described in U.S. Pat. No. 4,945,154.

The inventors have found that raising the temperature of a large quantity of resin for a short duration presents its own difficulties. Heat is typically transferred by heating the container within which the curable resin blend is contained which generates temperature gradients within the container.

It has been found that a convenient heating process involves passing the curable resin and curing agent through a narrow bore conduit, so that the heat has less distance over which to travel before the blending temperature is reached. This means that the material near the walls, which heats first, is not at the blending temperature for too long while the material at the centre begins to heat up.

Thus, preferably the process involves passing the solid powdered curing agent and semisolid curable resin through a conduit having a characteristic diameter of less than 20.0 cm, preferably less than 10.0 cm, more preferably less than 5.0 cm. The characteristic diameter is taken to be the inside diameter of a notional conduit having a circular cross-section having the same surface area as that of the cross-section of the conduit.

The walls of the conduit may be temperature controlled to the aforedescribed mixing temperatures, whilst the flow rates of the curing agent and curable resin control the composition of the blend and residence time of the blend at elevated mixing temperatures, to ensure optimized blending of the semisolid resin and the curing agent whilst preventing the curing reaction from proceeding to an advanced state. The residence times in the conduit are as hereinbefore described for mixing/blending. Following blending the blend or mixture may be cooled.

In one preferred embodiment, the conduit comprises mixing elements. The mixing elements may be static or dynamic. In one particularly preferred process, a screw extruder is employed to provide the conduit and the mixing elements.

Once the blending operation takes place then it is important to cool the blended curable resin to minimise any undesirable premature reaction and thermal hazard.

Once prepared, the blended curable resin is then impregnated into a structural fibre arrangement in a manner known in the art. The degree of impregnation may vary, but for wintersports applications it is generally intended to substantially completely impregnate the fibres. In this embodiment substantially all of the fibres are in contact with curable resin.

The prepregs are then ready for the production of the desired final article where they may be stacked in several plies or single or multiple layers may be bonded to other materials depending on the article being produced. For example, the prepregs may be used in the manufacture of automotive components, sporting goods such as racquets or skis and they may be bonded to other materials such as polyurethane foams, metals such as aluminium or wood. In the production of skis the prepregs are particularly beneficial in that they combine low tack at ambient temperature with high adhesion to aluminium after airing as shown by a peel strength of greater than 1 newton per square millimeter. In every instance the short cure cycle time of 95% cure at 120° C. in under 10 minutes or 95% cure at 130° C. in under 6 minutes is highly beneficial.

The invention is now disclosed by way of example only and with reference to the below Examples 1 and 2.

EXAMPLE 1

A composition called Invention 1 is prepared from 85.65 wt % of a semisolid bisphenol-A based resin LY1589 from Huntsman which was mixed with 14.35 wt % of a powdered curative system comprising:

62 wt % Dicyandiamide (DICY)

31 wt % Dyhard UR500 (blend of 2,4-toluene bis dimethyl urea and 2,6-toluene bis dimethyl urea accelerator)

7 wt % Sipernat D17 (silica based anticaking agent from Evonik)

The powdered curative system was mixed or blended so that 98% of the particles were of a size smaller than 10 microns.

The resin system has a viscosity at 25° C. of 1.18 MPas. It had a cold Tg of 17.29° C. Onset of cure occurred at 128.26° C. and the peak temperature during cure was 139° C.

A composition called Invention 2 was prepared from 81.37 wt % of a semisolid bisphenol-A based resin LY1589 from Huntsman which was mixed with 13.63 wt % of the powdered curative system of Invention 1, together with 5.00 wt % of a nitrile modified bis F epoxy block copolymer containing 40% by weight of nitrile rubber, available under the trade name Polydis PD3611.

A composition called Invention 3 was prepared from 77.08 wt % of a semisolid bisphenol-A based resin LY1589 which was mixed with 12.92 wt % of the powdered curative system of Invention 1, together with 10.00 wt % of a nitrile modified bis F epoxy block copolymer containing 40% by weight of nitrile rubber, available under the trade name Polydis PD3611.

The resin of the various Invention compositions was applied to a glass fibre web (LT570 from Hexcel) by the process illustrated in Figure 1 to form a prepreg comprising 34 wt % glass fibre and 66 wt % of the resin system as is typical for a winter sports prepreg used in ski manufacture.

The product was characterised in terms of peel strength to aluminium (using standard test DIN 53295), mechanical performance tests (tensile strength and tensile modulus in accordance with DIN EN ISO 527-4), isothermal cure was measured at 120° C. for 15 minutes and at 130° C. for 15 min by DSC in accordance with ASTM D3418, and also the resin flow was measured. The resin flow was measured as follows.

A round prepreg coupon having a surface area of 100 cm² is cut from the prepreg. The mass $m_1$ of the coupon is determined. The coupon is subsequently cured in a heated press at a temperature of 130° C. for 10 minutes and at a pressure of 5 bar. A circular coupon with diameter 50 mm is then cut from the cured coupon and the mass $m_2$ is determined. The resin flow R (%) is then calculated as follows:

$$R(\%)=(m_1-(m_2 \times f))/m_1 \times 100$$

Wherein f=5.09.

The prepregs containing the resin composition of the Inventions 1 to 3 were compared to a comparable prepreg also containing 34 wt % glass fibre prepared from the Hexcel product Hexply using an X1 resin formulation which contains two liquid bisphenol-A based epoxy resins in combination with 69 wt % dicyandiamide, and 31 wt % Dyhard UR500. This formulation is also compared with a pre-reacted (B-staged) commercial system with long open time (SLOT) based prepreg as conventionally used in the production of wintersports goods, having a glass fibre content of 39 wt %.

The results are shown in the below Table 1.

TABLE 1

Results. The data is normalised to reflect a 50% by volume glass fibre material.

| | Method/standard | Invention 1 | Invention 2 | Invention 3 | X1 | SLOT |
|---|---|---|---|---|---|---|
| Peel Strength | DIN53295 | 2.19 N/mm² | 3.1 N/mm² | 5.8 N/mm² | 4.6 N/mm² | 1.61 N/mm² |
| Resin Flow | | 15.0% | 15.0% | 15.0% | 15.0% | NA |
| Isothermal Cure @ 120° C., 15 min (DSC) | 95% conv. Tg | 8 min 126° C. | 9.2 min 124° C. | 9.7 min 122° C. | 8.3 min 125° C. | 15 min −80° C. |
| Isothermal Cure @ 130° C., 15 min (DSC) | 95% Tg | 4.7 min 125° C. | 5.6 min 117° C. | 5.8 min 115° C. | 5 min 135° C. | NA NA |
| Mechanical Performance | Tensile Strength | 750 MPa | 790 MPa | 826 MPa | 850 MPa | 870 MPa |
| Mechanical Performance | Tensile Strength | 30.5 GPa | 31.9 GPa | 32.3 GPa | 32 GPa | 32 GPa |

Once prepared the prepreg containing the resin formulation of the invention could be rolled-up, so that it can be stored for a period of time. It can then be unrolled and cut as desired and optionally laid up with other prepregs to form a prepreg stack in a mould or in a vacuum bag which is subsequently placed in a mould.

EXAMPLE 2

The composition of Invention 3 is combined with fabric of different weights F35 fleece, 35 g/m² and F65 fleece, 55 g/m² both supplied by Hexcel Corporation. The fabrics were impregnated with the composition. In addition in Samples B and D a diluent in the form of glass spheres (Spheriglass A glass 2227 as supplied by Potters Industries LLC) was added. The resulting resin contents in the composition as wt % based on the overall weight of the composition are present in the below Table 2. This Table also shows the relative peel strength in relation to Sample A when each of the compositions is applied to an aluminium sheet and cured for 7 minutes at a temperature of 130° C. The 2227 content in Samples B and D is 70 g/m².

TABLE 2

| Sample | Composition | Resin content (wt %) | fiber weight (g/m²) | Relative peel strength (in relation to Sample A) - ASTMD1876 |
|---|---|---|---|---|
| A | Invention 3/F35 | 80% | 35 | 1 |
| B | Invention 3/F35 + 2227 | 57% | 35 | 1.3 |
| C | Invention 3/F65 | 80% | 55 | 2.0 |
| D | Invention 3/F65 + 2227 | 64% | 55 | 2.2 |

There is thus provided a composition and a process as herein before described. The composition and process is particularly suited to the manufacture of winter sports equipment in combination with fibrous reinforcement and/or polyurethane core materials.

The invention claimed is:

1. A composition comprising a semisolid epoxy resin containing a curative dispersed therein, said curative having a particle size such that at least 90% of the particles have a size below 25 µm at ambient temperature of 21° C., as determined in accordance with ASTM D1214, wherein the composition further comprises a diluent; said diluent comprising a particulate filler selected from micro balloons, glass, carbon, metal and/or combinations of the aforesaid fillers;
   and wherein, said composition further comprises a fibrous material, comprising a fleece.

2. A composition according to claim 1, wherein the composition is in the form of a prepreg.

3. A composition according to claim 2 wherein the diluent is present on the surface of the fibrous reinforcement material.

4. A composition according to claim 1 in which at least 90% of the curative has an average particle size below 10 µm.

5. A composition according to claim 1 in which the curative comprises dicyandiamide.

6. A composition according to claim 1 in which the curative comprises a urea derivative.

7. A composition according to claim 1 that can be cured to provide a 95% cure at 120° C. in no more than 10 minutes and a 95% cure at 130° C. in no more than 6 minutes.

\* \* \* \* \*